(12) United States Patent
Tamura

(10) Patent No.: US 11,659,096 B2
(45) Date of Patent: May 23, 2023

(54) GATEWAY DEVICE, RADIO COMMUNICATION DEVICE, CHARGING CONTROL METHOD, DATA TRANSMISSION METHOD, AND NON-TRANSITORY COMPUTER READABLE MEDIUM

(71) Applicant: NEC Corporation, Tokyo (JP)

(72) Inventor: Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 3 days.

(21) Appl. No.: 17/307,200

(22) Filed: May 4, 2021

(65) Prior Publication Data
US 2021/0258429 A1 Aug. 19, 2021

Related U.S. Application Data

(63) Continuation of application No. 16/935,414, filed on Jul. 22, 2020, now Pat. No. 11,032,431, which is a
(Continued)

(30) Foreign Application Priority Data

Sep. 14, 2015 (JP) .............................. JP2015-180484

(51) Int. Cl.
*H04W 4/24* (2018.01)
*H04M 15/00* (2006.01)
(Continued)

(52) U.S. Cl.
CPC ........... *H04M 15/55* (2013.01); *H04M 15/66* (2013.01); *H04W 4/24* (2013.01); *H04W 16/14* (2013.01);
(Continued)

(58) Field of Classification Search
CPC ....... H04M 15/55; H04M 15/66; H04W 4/24; H04W 16/14; H04W 36/28; H04W 76/00;
(Continued)

(56) References Cited

U.S. PATENT DOCUMENTS 9,839,002 B2 * 12/2017 Jin ....................... H04W 60/04
2012/0033638 A1 2/2012 Nishida et al.
(Continued)

FOREIGN PATENT DOCUMENTS

CN 101374260 A 2/2009
CN 104796948 A 7/2015
(Continued)

OTHER PUBLICATIONS

Chinese Office Action for CN Application No. 202010927327.9 dated Aug. 30, 2021 with English Translation.
(Continued)

*Primary Examiner* — Chuong A Ngo

(57) ABSTRACT

To provide a gateway device that achieves charging control in accordance with a RAT being used by a UE even when the UE is performing communication using different RATs at the same time, the present gateway device (30) includes a management unit (31) configured to, when a communication terminal (10) forms communication aggregation by performing a first radio communication using a first radio access technology and a second radio communication using a second radio access technology, manage at least one bearer assigned to the communication terminal (10) in association with information indicating the first and second radio access technologies, and a charging system communication unit (32) configured to transmit the information indicating the first and second radio access technologies to at least one policy charging control device (40) that performs charging control.

4 Claims, 19 Drawing Sheets

Related U.S. Application Data continuation of application No. 16/251,628, filed on Jan. 18, 2019, now Pat. No. 10,764,443, which is a continuation of application No. 15/759,115, filed as application No. PCT/JP2016/003998 on Sep. 1, 2016, now abandoned.

(51) Int. Cl.

| | | |
|---|---|---|
| H04W 16/14 | (2009.01) | |
| H04W 88/06 | (2009.01) | |
| H04W 88/16 | (2009.01) | |
| H04W 92/24 | (2009.01) | |
| H04W 36/28 | (2009.01) | |
| H04W 76/00 | (2018.01) | |
| H04W 76/15 | (2018.01) | |

(52) U.S. Cl.
CPC ........... *H04W 36/28* (2013.01); *H04W 76/00* (2013.01); *H04W 76/15* (2018.02); *H04W 88/06* (2013.01); *H04W 88/16* (2013.01); *H04W 92/24* (2013.01)

(58) Field of Classification Search
CPC ..... H04W 76/15; H04W 88/06; H04W 88/16; H04W 92/24; H04W 72/04; H04L 12/1407

See application file for complete search history.

(56) References Cited

U.S. PATENT DOCUMENTS

| | | |
|---|---|---|
| 2013/0044709 A1 | 2/2013 | Adjakple et al. |
| 2013/0070596 A1 | 3/2013 | Yeh et al. |
| 2013/0321558 A1 | 12/2013 | Nishida et al. |
| 2015/0181473 A1 | 6/2015 | Horn et al. |
| 2015/0181504 A1 | 6/2015 | Tsai |
| 2015/0215965 A1 | 7/2015 | Yamada |
| 2016/0249259 A1 | 8/2016 | Park et al. |
| 2017/0079087 A1 | 3/2017 | Xu et al. |
| 2018/0020386 A1 | 1/2018 | Chandramouli et al. |
| 2018/0288233 A1 | 10/2018 | Tamura |
| 2019/0174371 A1 | 6/2019 | Lee et al. |
| 2020/0092795 A1* | 3/2020 | Raval .................... H04L 63/101 |

FOREIGN PATENT DOCUMENTS

| | | |
|---|---|---|
| EP | 2395786 A1 | 12/2011 |
| EP | 3021635 B1 | 12/2017 |
| JP | 2010-183542 A | 8/2010 |
| JP | 2014-526210 A | 10/2014 |
| KR | 10-2015-0096499 A | 8/2015 |
| RU | 2377741 C1 | 12/2009 |
| WO | WO-2009/130179 A1 | 10/2009 |
| WO | WO-2009/132824 A2 | 11/2009 |
| WO | WO-2013/041045 A1 | 3/2013 |
| WO | WO-2013/161274 A1 | 10/2013 |
| WO | 2015/115606 A1 | 8/2015 |
| WO | WO-2017/007201 A1 | 1/2017 |

OTHER PUBLICATIONS

Korean Office Communication for KR Application No. 10-2018-7010435 dated Nov. 4, 2021 with English Translation.
3GPP "3rd Generation Partnership Project; Technical Specification Group Radio Access Network; Evolved Universal Terrestrial Radio Access Network (E-UTRAN); Extension of Dual Connectivity In E-UTRAN (Release 13)"; 3GPP TR 36.875, V13.0.0 (Jun. 2015), Jun. 30, 2015, vol. RAN WG3, No. V13.0.0, pp. 1-38 (38 pages).
3GPP "3rd Generation Partnership Project; Technical Specification Group Radio Access Network; Evolved Universal Terrestrial Radio Access Network (E-UTRAN); Extension of Dual Connectivity in EUTRAN (Release 13)" 3GPP TR 36.875 V1.2.0 (May 2015), pp. 1-38.
3GPP TS 23.203 V13.4.0 Policy and charging control architecture (Release 13) (Jun. 2015) (pp. 1-235).
3GPP TS 23.401 V13.1.0 General Packet Radio Service (GPRS) enhancements for Evolved Universal Terrestrial Radio Access Network (E-UTRAN) access (Release 13) (Dec. 2014) (pp. 1-310).
3GPP TS 36.300 V13.0.0 Evolved Universal Terrestrial Radio Access (E-UTRA) and Evolved Universal Terrestrial Radio Access Network (E-UTRAN); Overall description; Stage 2 (Release 13) (Jun. 2015) (pp. 1-254).
3GPP TSG RAN Meeting #67, RP-150510, Intel Corporation, China Telecom, Qualcomm Incorporated: NEW WI Proposal: LTE-WLAN Radio Level Integration and Interworking Enhancement, Mar. 9-12, 2015 (8 pages).
3GPP TSG-RAN WG2 #91 R2-153813, Qualcomm Incorporated, NTT DOCOMO, Policing, Authorization, and Charging for LTE/WLAN Aggregation, Aug. 28, 2015 (pp. 1-2).
3GPP TSG-SA WG1 #71 bis S1-153008, NEC, Smarter Service requirement on charging for multi RAT connections, Oct. 21, 2015 (5 pages).
China Notification of First Office Action issued in Chinese Patent Application No. 201680052954.4, dated Apr. 23, 2020, 17 pages.
Extended European Search Report issued in European Patent Application No. 16845907.1, dated Dec. 21, 2018, 10 pages.
International Search Report corresponding to PCT/JP2016/003998 dated Nov. 29, 2016 (2 pages).
Japanese Decision to Grant a Patent issued in Japanese Patent Application No. 2017-540484, dated Jun. 30, 2020, 5 pages.
LG Electronics Inc. "Consideration on Open Issues for Path Switch", 3GPP TSG-RAN WG3 Meeting #85bis, R3-142390, Shanghai, China, Oct. 6-10, 2014, pp. 1-6 (6 pages).
NEC "Smarter Service Requirement on Charging for Multi RAT Connections", 3GPP TSG-SA WG1 #71 bis ad-hoc, S1-153143 (was S1-153008), Vancouver, Canada, Oct. 19-21, 2015, 4 pages.
Russian Official Action of the Substantive Examination issued in Russian Patent Application No. 2018113464/07(021137), dated Mar. 2, 2020, 16 pages.
ZTE "SIPTO/LIPA Support in Dual Connectivity", 3GPP TSG-RAN WG3 #89, R3-151512, Beijing, China, Aug. 24-28, 2015, 8 pages.
Qualcomm Incorporated et al., Deployment Scenarios and Requirements for LTE-WLAN Aggregation, 3GPP TSG-RAN WG2 Meeting #89bis, Bratislava, Slovakia, R2-151655, Apr. 20-24, 2015.
MediaTek Inc., Network Selection and Data Aggregation with LTE-WLAN Aggregation, 3GPP TSG-RAN2#89BIS meeting, R2-151681, Bratislava, Slovakia, Apr. 20-24, 2015.
KDDI Corporation, Dealing with WLAN traffic overloading for LTE/WLAN aggregation, 3GPP TSG-RAN2 Meeting #90, R2-152515, Fukuoka, Japan, May 25-29, 2015.
Qualcomm Incorporated et al., Policing, Authorization, and Charging for LTE/WLAN Aggregation, 3GPP TSG-RAN WG2 Meeting #91, Beijing, China, R2-153813, Aug. 24-28, 2015.
Intel Corporation et al., Running 36.300 CR for LTE-WLAN Radio Level Integration and Interworking Enhancement, 3GPP TSG-RAN2 Meeting 91, R2-153970, Beijing, P.R.China, Aug. 24-28, 2015.
NEC Corporation, Support of CSG/Hybrid for Dual Connectivity, 3GPP TSG RAN3 Meeting #87, R3-150171, Athens, Greece, Feb. 9-13, 2015.
Alcatel-Lucent Shanghai Bell et al., Requirements and solutions for supporting Hybrid HeNBs in dual connectivity, 3GPP TSG RAN WG3 Meeting #87, R3-150208, Athens, Greece, Feb. 9-13, 2015.
ZTE, Sipto/Lipa support in dual connectivity, 3GPP TSG-RAN WG3 Meeting #89, R3-151512, Beijing, China, Aug. 24-28, 2015.
ZTE, Down selection of solutions for membership verification, 3GPP TSG-RAN WG3 Meeting #89, R3-151519, Beijing, P.R. China, Aug. 24-28, 2015.
LG Electronics Inc., Hybrid Mode HeNB Support for Dual Connectivity, 3GPP TSG-RAN WG3 Meeting #89, R3-151689, Beijing, China, Aug. 24-28, 2015.
Qualcomm Incorporated, Discussion on system aspects of LAA and LWA, 3GPP TSG-SA2 Meeting SA WG2 Meeting #110, S2-152188, Jul. 6-10, 2015, Dubrovnik, Croatia.

(56) References Cited

OTHER PUBLICATIONS

3rd Generation Partnership Project, Technical Specification Group Radio Access Network, Evolved Universal Terrestrial Radio Access Network (E-UTRAN); Extension of dual connectivity in E-UTRAN (Release 13), 3GPP TR 36.875 V13.0.0, Jul. 2015.

3rd Generation Partnership Project, Technical Specification Group Radio Access Network, Study on Wireless Local Area Network (WLAN)—3GPP radio interworking (Release 12), 3GPP TR 37.834 V12.0.0, Dec. 2013.

3rd Generation Partnership Project, Technical Specification Group Radio Access Network, Evolved Universal Terrestrial Radio Access Network (E-UTRAN), S1 Application Protocol (S1AP) (Release 13), 3GPP TS 36.413 V13.0.0, June, 20155.

Japanese Office Action for JP Application No. 2020-128222 dated Jun. 29, 2021 with English Translation.

\* cited by examiner

| For each EPS Bearer within the PDN Connection:<br>NOTE 1: The following entries defining the EPS bearer specific parmeters are included within the set of parameters defining the PDN Connection.<br>NOTE 2: The following entries are stored only for GTP-based S5/S8. |
|---|
| Field |
| EPS Bearer Id |
| TFT |
| S-GW Address in Use (userplane) |
| S-GW TEID for S5/S8 (userplane) |
| P-GW IP address for S5/S8 (userplane) |
| P-GW TEID for S5/S8 (userplane) |
| EPS Bearer QoS |
| Charging Id |
| RAT type |

Fig. 5

E-RAB MODIFICATION INDICATION

| IE/Group Name |
|---|
| Message Type |
| MME UE S1AP ID |
| eNB UE S1AP ID |
| E-RAB to be Modified List |
| >E-RAB to be Modified Item IEs |
| >>E-RAB ID |
| >>Transport Layer Address |
| >>DL GTP TEID |
| >>RAT Type (5G) |
| E-RAB not to be Modified List |
| >E-RAB not to be Modified Item IEs |
| >>E-RAB ID |
| >>Transport Layer Address |
| >>DL GTP TEID |
| >>RAT Type(LTE) |

Fig. 9

Bearer Context to be modified within Modify Bearer Request

| Octet 1 | Bearer Context IE Type = 93 (decimal) | | | |
|---|---|---|---|---|
| Octet 2 and 3 | Length = n | | | |
| Octet 4 | Spare and Instance fields | | | |
| Information elements | P | Condition / Comment | IE Type | Ins. |
| EPS Bearer ID | M | ... | EBI | 0 |

| RAT Type | C | | | |
|---|---|---|---|---|

Fig. 10

Bearer Context to be created within Create Session Request

| Octet 1 | Bearer Context IE Type = 93 (decimal) | | | |
|---|---|---|---|---|
| Octet 2 and 3 | Length = n | | | |
| Octet 4 | Spare and Instance fields | | | |
| Information elements | P | Condition / Comment | IE Type | Ins. |
| EPS Bearer ID | M | | EBI | 0 |
| ... | | | | |
| RAT Type | C | | | |

Fig. 11

| Bearer Context to be created within Bearer Resource Command message | | | | |
|---|---|---|---|---|
| Octet 1 | Bearer Context IE Type = 93 (decimal) | | | |
| Octet 2 and 3 | Length = n | | | |
| Octet 4 | Spare and Instance fields | | | |
| Information elements | P | Condition / Comment | IE Type | Ins. |
| EPS Bearer ID | M | | EBI | 0 |
| RAT Type | C | | | |

Fig. 12

Bearer Context to be modified within Modify Access Bearer Request

| Octet 1 | Bearer Context IE Type = 93 (decimal) | | |
|---|---|---|---|
| Octet 2 and 3 | Length = n | | |
| Octet 4 | Spare and Instance fields | | |
| Information elements | P | Condition / Comment | IE Type |
| EPS Bearer ID | M | | EBI |

| | | | |
|---|---|---|---|
| | | | Ins. |
| | | | 0 |

| RAT Type | C | | |

Fig. 13

| Bearer Context to be created within Context Request | | | | | |
|---|---|---|---|---|---|
| Octet 1 | Bearer Context IE Type = 93 (decimal) | | | | |
| Octet 2 and 3 | Length = n | | | | |
| Octet 4 | Spare and Instance fields | | | | |
| Information elements | P | Condition / Comment | | IE Type | Ins. |
| EPS Bearer ID | M | | | EBI | 0 |
| RAT Type | C | | | | |

Fig. 14

| Octet 1 | Bearer Context IE Type = 93 (decimal) | | | |
|---|---|---|---|---|
| Octet 2 and 3 | Length = n | | | |
| Octet 4 | Spare and Instance fields | | | |
| Information elements | P | Condition / Comment | IE Type | Ins. |
| EPS Bearer ID | M | | EBI | 0 |
| RAT Type | C | | | |

Bearer Context to be created within Change Notification Request

Fig. 15

| RAT types | Values (Decimal) |
|---|---|
| <reserved> | 0 |
| UTRAN | 1 |
| GERAN | 2 |
| WLAN | 3 |
| GAN | 4 |
| HSPA Evolution | 5 |
| EUTRAN | 6 |
| Virtual | 7 |
| 5G | 8 |
| <spare> | 9-255 |

| RAT types | Values (Decimal) |
|---|---|
| <reserved> | 0 |
| UTRAN | 1 |
| GERAN | 2 |
| WLAN | 3 |
| GAN | 4 |
| HSPA Evolution | 5 |
| EUTRAN | 6 |
| Virtual | 7 |
| EUTRAN + WLAN | 8 |
| <spare> | 9-255 |

Fig. 20

| RAT types | Values (Decimal) |
|---|---|
| <reserved> | 0 |
| UTRAN | 1 |
| GERAN | 2 |
| WLAN | 3 |
| GAN | 4 |
| HSPA Evolution | 5 |
| EUTRAN | 6 |
| Virtual | 7 |
| EUTRAN + WLAN | 6+3 |
| <spare> | 8-255 |

Fig. 21

E-RAB MODIFICATION INDICATION

| IE/Group Name |
|---|
| Message Type |
| MME UE S1AP ID |
| eNB UE S1AP ID |
| E-RAB to be Modified List |
| >E-RAB to be Modified Item IEs |
| >>E-RAB ID |
| >>Transport Layer Address |
| >>DL GTP TEID |
| >>RAT Type |

Fig. 22

GATEWAY DEVICE, RADIO COMMUNICATION DEVICE, CHARGING CONTROL METHOD, DATA TRANSMISSION METHOD, AND NON-TRANSITORY COMPUTER READABLE MEDIUM

CROSS-REFERENCE TO RELATED APPLICATIONS

This application is continuation of U.S. patent application Ser. No. 16/935,414, entitled "Gateway Device, Radio Communication Device, Charging Control Method, Data Transmission Method, And Non-Transitory Computer Readable Medium", filed on Jul. 22, 2020, which is a continuation of U.S. patent application Ser. No. 16/251,628, entitled "Gateway Device, Radio Communication Device, Charging Control Method, Data Transmission Method, And Non-Transitory Computer Readable Medium", filed on Jan. 18, 2019, now U.S. Pat. No. 10,764,443, which is a continuation of U.S. patent application Ser. No. 15/759,115, entitled "Gateway Device, Radio Communication Device, Charging Control Method, Data Transmission Method, and Non-Transitory Computer Readable Medium," filed on Mar. 9, 2018, which is a 371 national stage of International Application No. PCT/JP2016/003998, filed on Sep. 1, 2016, which claims priority to Japanese Patent Application No. 2015-180484, filed on Sep. 14, 2015, the disclosures of which are hereby incorporated by reference in their entirety.

TECHNICAL FIELD

The present invention relates to a gateway device, a radio communication device, a charging control method, a data transmission method, and a program and, particularly, relates to a gateway device, a radio communication device, a charging control method, a data transmission method, and a program using a plurality of radio access technologies.

BACKGROUND ART

3GPP (3rd Generation Partnership Project), a standard specification for mobile communication systems, introduces dual connectivity as a technique for a communication terminal UE (User Equipment) to carry out wideband and low-delay communications. The dual connectivity is a technique that allows a UE to have dual connections to a first base station MeNB (Master evolved NodeB) and a second base station SeNB (Secondary eNB) that perform LTE (Long Term Evolution) communications, for example, so that the UE communicates not only with the MeNB but also with the SeNB. This improves the throughput of communications.

Non Patent Literature 1 describes, as a dual connectivity procedure, a process flow or the like where a UE newly adds an SeNB as an eNB to communicate with the UE when the UE is being connected with an MeNB.

On the other hand, areas where wireless LAN (Local Area Network) communications, which enable high-speed communications although the coverage area is smaller than mobile communication systems, are available have been expanded recently. Thus, a technique where a UE connects to both an eNB that performs mobile communications and an access point WT (Wireless LAN Termination) that performs wireless LAN communications by applying the dual connectivity technology, and the UE communicates not only with the eNB but also with the WT (which is referred to hereinafter as LTE-WT aggregation, which may also be referred to as LTE-WT dual connectivity), has also been studied. To be more specific, the background, object and the like of this study are described in Non Patent Literature 2.

Note that a charging rate to be applied to a UE is determined on the basis of a radio access technology (RAT) being used by the UE. For example, when a UE is performing LTE communications with an MeNB and an SeNB in dual connectivity, a charging rate determined at the time of LTE communications is applied to the UE. Non Patent Literature 3 describes a PCC (Policy and Charging Control) architecture for carrying out policy control and charging control.

Non Patent Literature 4 describes that a gateway device PGW (Packet Date Network Gateway) manages RAT types on a UE-by-UE basis as parameters related to charging. The RAT type is a parameter indicating a RAT that is currently used by a UE.

CITATION LIST

Non Patent Literature

NPL1: 3GPP TS 36.300 V13.0.0 (2015-06) Section 10.1.2.8
NPL2: 3GPP TSG RAN Meeting #67 (2015-03) RP-150510
NPL3: 3GPP TS 23.203 V13.4.0 (2015-06) Section 5, Section A.4.2
NPL4: 3GPP TS 23.401 V13.1.0 (2014-12) Section 5.7.4

SUMMARY OF INVENTION

Technical Problem

In the case of executing the dual connectivity described in Non Patent Literature 1, a UE performs communications with an MeNB and an SeNB simultaneously by using one RAT. In this case, no problem arises when RAT types as charging parameters are managed on a UE-by-UE basis as described in Non Patent Literature 4. However, in the case where a UE performs LTE-WT aggregation as described in Non Patent Literature 2, the UE performs communications using two types of RATs at the same time. Therefore, if a PGW manages RAT types on a UE-by-UE basis as described in Non Patent Literature 4, there is a possibility that a RAT type that is managed by the PGW and a RAT that is actually used by the UE could be different. This causes a problem that, when a UE performs communications using two types of RATs, it is not possible to conduct adequate charging control (apply a charging rate) in accordance with actual communications.

An exemplary object of the present invention is to provide a gateway device, a radio communication device, a charging control method, a data transmission method, and a program that achieve charging control in accordance with a RAT being used by a UE even when the UE is performing communications using different RATs at the same time.

Solution to Problem

A gateway device according to a first exemplary aspect of the present invention includes a management unit configured to, when a communication terminal forms communication aggregation by performing a first radio communication using a first radio access technology and a second radio communication using a second radio access technology, manage at least one bearer assigned to the communication terminal in association with information indicating the first and second radio access technologies, and a charging system communication unit configured to transmit the information indicating the first and second radio access technologies to at least one charging control device that performs charging control.

A radio communication device according to a second exemplary aspect of the present invention is a radio communication device that performs a first radio communication using a first radio access technology with a communication terminal, wherein, when the communication terminal forms communication aggregation by performing the first radio communication and a second radio communication using a second radio access technology, the radio communication device transmits information associating at least one bearer assigned to the communication terminal and information indicating the first and second radio access technologies to a network device that manages the bearer.

A charging control method according to a third exemplary aspect of the present invention includes, when a communication terminal forms communication aggregation by performing a first radio communication using a first radio access technology and a second radio communication using a second radio access technology, managing at least one bearer assigned to the communication terminal in association with information indicating the first and second radio access technologies, and transmitting the information indicating the first and second radio access technologies to at least one charging control device that performs charging control.

A data transmission method according to a fourth exemplary aspect of the present invention is a data transmission method used in a radio communication device that performs a first radio communication using a first radio access technology with a communication terminal, the method including, when the communication terminal forms communication aggregation by performing the first radio communication and a second radio communication using a second radio access technology, transmitting information associating at least one bearer assigned to the communication terminal and information indicating the first and second radio access technologies to a network device that manages the bearer.

A program according to a fifth exemplary aspect of the present invention causes a computer to execute, when a communication terminal forms communication aggregation by performing a first radio communication using a first radio access technology and a second radio communication using a second radio access technology, managing at least one bearer assigned to the communication terminal in association with information indicating the first and second radio access technologies, and transmitting the information indicating the first and second radio access technologies to at least one charging control device that performs charging control.

Advantageous Effects of Invention

According to the exemplary aspects of the present invention, it is possible to provide a gateway device, a radio communication device, a charging control method, a data transmission method, and a program that achieve charging control in accordance with a RAT being used by a UE even when the UE is performing communications using different RATs at the same time.

BRIEF DESCRIPTION OF DRAWINGS

FIG. 5 is a view showing parameters managed by the PGW according to the second embodiment.

FIG. 9 is a view showing parameter information set to an E-RAB Modification Indication message according to the second embodiment.

FIG. 10 is a view showing parameter information set to a Modify Bearer Request message according to the second embodiment.

FIG. 11 is a view showing parameter information set to a Create Session Request message according to the second embodiment.

FIG. 12 is a view showing parameter information set to a Bearer Resource Command message according to the second embodiment.

FIG. 13 is a view showing parameter information set to a Modify Access Bearers Request message according to the second embodiment.

FIG. 14 is a view showing parameter information set to a Context Request message according to the second embodiment.

FIG. 15 is a view showing parameter information set to a Change Notification Request message according to the second embodiment.

FIG. 20 is a view to explain values of RAT types according to the third embodiment.

FIG. 21 is a view to explain values of RAT types according to the third embodiment.

FIG. 22 is a view showing parameter information set to an E-RAB Modification Indication message according to the third embodiment.

DESCRIPTION OF EMBODIMENTS

First Embodiment

Embodiments of the present invention are described hereinafter with reference to the drawings. A configuration example of a communication system according to a first embodiment of the present invention is described with reference to FIG. 1.

Figure 1:
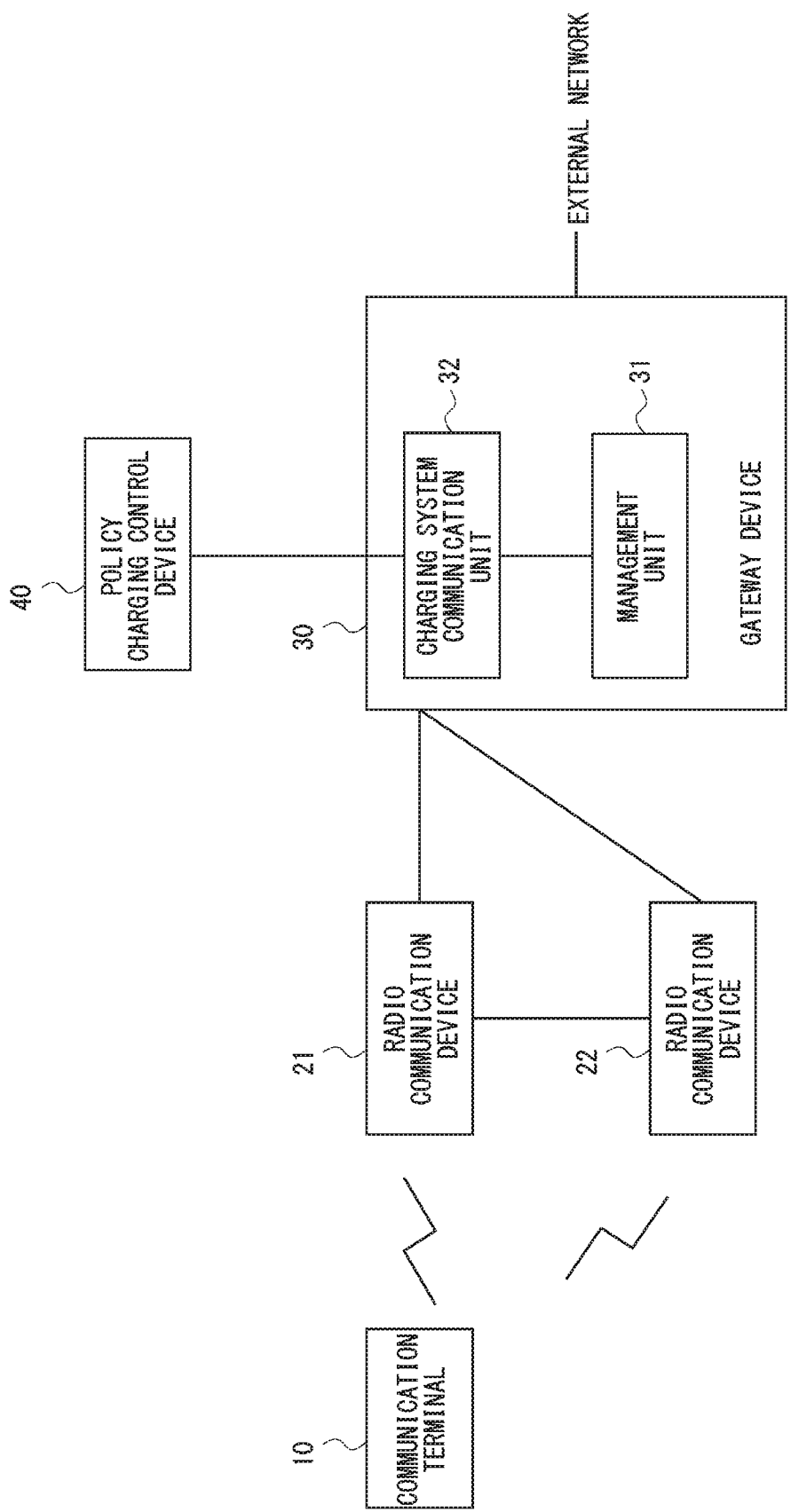
FIG. 1 is a schematic diagram of a communication system according to a first embodiment.

The communication system in FIG. 1 includes a communication terminal 10, a radio communication device 21, a radio communication device 22, a gateway device 30, and a policy charging control device 40.

The communication terminal 10 may be a mobile phone terminal, a smartphone, a tablet terminal or the like. Further, the communication terminal 10 may be a UE, which is used as a general term for communication terminals in the 3GPP. Furthermore, the communication terminal 10 may be a terminal that performs communications using a 2G (2nd Generation mobile phone) radio access technology, a 3G (3rd Generation mobile phone) radio access technology, an LTE radio access technology, a 4G/5G (4th/5th mobile phone) radio access technology, or a radio access technology dedicated to supporting CIoT (Cellular IoT (Internet of Things)). Further, the communication terminal 10 is a terminal capable of performing simultaneous communications (dual connections) using a plurality of different radio access technologies. For example, the communication terminal 10 may be a terminal that performs a mobile communication using a radio access technology specified in the 3GPP and a wireless LAN communication at the same time. Further, the communication terminal 10 may be a terminal that performs the LTE radio access technology and the 5G radio access technology at the same time.

The radio communication device 21 and the radio communication device 22 perform radio communications with the communication terminal 10 by using a predetermined radio access technology (RAT). The communication terminal 10 performs radio communications with the radio communication device 22 by using a RAT different from a RAT used for radio communications with the radio communication device 21. A feature where the communication terminal 10 performs radio communications with the radio communication device 21 and the radio communication device 22 by using different RATs at the same time is called communication aggregation, hybrid dual connectivity or the like.

One RAT used in the communication aggregation may be LTE whose communication specifications are defined in the 3GPP, or a radio communication technology whose communication specifications will be defined in the 3GPP in the future. This radio communication technology may be called 5G or the like, for example. The other RAT used in the communication aggregation may be wireless LAN.

The policy charging control device 40 is a device that performs control regarding a service policy and charging related processing related to the communication terminal 10.

The gateway device 30 is a gateway device that is used when the communication terminal 10 communicates with a network including the radio communication device 21 and the radio communication device 22, a network where a service is provided, or a different external network. Further, the gateway device 30 transmits charging parameters related to the communication terminal 10 to the policy charging control device 40.

A configuration example of the gateway device 30 is described hereinafter. The gateway device 30 may be a computer device that operates when a processor executes a program stored in a memory.

The gateway device 30 includes a management unit 31 and a charging system communication unit (note that the communication unit is, in other words, a transmitting and receiving unit) 32. The elements that constitute the gateway device 30 including the management unit 31, the charging system communication unit 32 and the like may be software, a module or the like whose processing is executed by running, on a processor, a program stored in a memory. Further, the elements that constitute the gateway device 30 may be software such as a circuit or a chip.

When the communication terminal 10 performs radio communications with the radio communication device 21 and the radio communication device 22 and forms the communication aggregation, the management unit 31 manages at least one bearer assigned to the communication terminal 10 and information indicating a RAT to be used for communications with the radio communication device 21 and a RAT to be used for communications with the radio communication device 22 in association with each other. For example, in the case where a bearer that is assigned to enable the communication terminal 10 to perform a communication through the radio communication device 21 and a bearer that is assigned to enable the communication terminal 10 to perform a communication through the radio communication device 22 are different, the management unit 31 manages a bearer and a RAT in one-to-one association.

Alternatively, in the case where one bearer is assigned to the communication terminal 10, and a RAT to be used for communications with the radio communication device 21 and a RAT to be used for communications with the radio communication device 22 are contained in one bearer, the management unit 31 manages two RATs in association with one bearer. Note that three or more RATs may be associated with one bearer.

The charging system communication unit 32 transmits, to the policy charging control device 40, information regarding RATs that are managed on a bearer-by-bearer basis in the management unit 31.

As described above, the gateway device 30 manages the RAT being used by the communication terminal 10 in association with each bearer and thereby notifies the policy charging control device 40 of the RAT being used by the communication terminal 10 on a bearer-by-bearer basis. The policy charging control device 40 can thereby accurately grasp the RAT actually used by the communication terminal 10 and perform charging control in accordance with the RAT.

Second Embodiment

Figure 2:
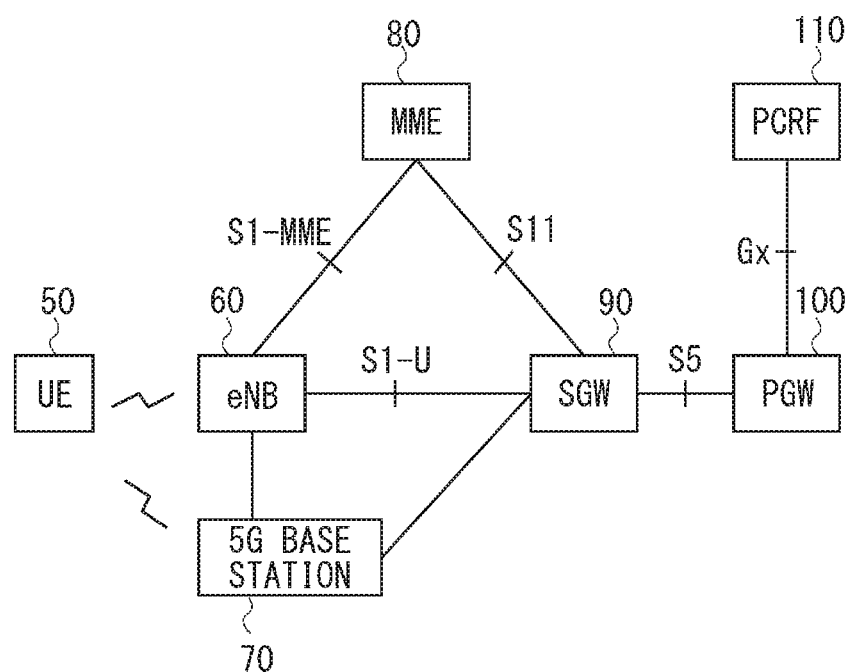
FIG. 2 is a schematic diagram of a communication system according to a second embodiment.

A configuration example of a communication system according to a second embodiment of the present invention is described with reference to FIG. 2. In FIG. 2, a configuration example of a communication system that is composed of nodes defined in the 3GPP is described. Note that, in FIG. 2, illustration of a charging system is omitted, and the charging system is described later with reference to FIG. 3.

The communication system in FIG. 2 includes a UE 50, an eNB 60, which is a base station for LTE, a 5G base station 70, which is a base station for 5G, a mobility management node MME (Mobility Management Entity) 80, a SGW (Serving Gateway) 90, a PGW 100, and a PCRF (Policy Control and Charging Rules) entity 110 (which is referred to hereinafter as PCRF 110).

The UE 50 corresponds to the communication terminal 10 in FIG. 1. The eNB 60 corresponds to the radio communication device 21 in FIG. 1. The 5G base station 70 corresponds to the radio communication device 22 in FIG. 1. The PGW 100 corresponds to the gateway device 30 in FIG. 1. The PCRF 110 corresponds to the policy charging control device 40 in FIG. 1.

The 5G base station 70 is a base station that supports 5G radio communications, which are next-generation radio communications to be defined in the 3GPP in the future. Although the next-generation radio communication technology or radio access technology is called 5G for the sake of making the explanation easier, it is not limited to being named 5G. Further, the UE 50 is a terminal that supports both the LTE and the 5G radio communications.

The MME 80 is a device that mainly gives a request or an instruction for mobility management and bearer setting of the UE 50, or a request or an instruction for removal of a bearer. The SGW 90 and the PGW 100 are gateway devices that relay user data (packets) transmitted or received by the UE 50. The SGW 90 accommodates a radio access system, and the PGW 100 connects to an external network (PDN: Packet Data Network etc.). The PCRF 110 determines policies (charging system) regarding QoS control, charging control or the like in the SGW 90 and the PGW 100.

Interfaces between devices in the 3GPP are described hereinafter. An S1-MME interface is defined between the eNB 60 and the MME 80. An S1-U interface is defined between the eNB 60 and the SGW 90. An S11 interface is defined between the MME 80 and the SGW 90. An S5 interface is defined between the SGW 90 and the PGW 100. A Gx interface is defined between the PGW 100 and the PCRF 110. Note that the term "interface" may be replaced by the term "reference point".

An interface corresponding to an X2 interface, which is specified as an interface between eNBs, may be defined between the eNB 60 and the 5G base station 70. Further, an interface corresponding to the S1-U interface may be defined between the 5G base station 70 and the SGW 90. Note that, in the case where no interface is set between the 5G base station 70 and the SGW 90, the 5G base station 70 can transmit and receive data to and from the SGW 90 through the eNB 60.

The communication system in FIG. 2 shows that the UE 50 performs LTE communications with the eNB 60 and performs 5G radio communications with the 5G base station 70 and forms LTE-5G aggregation. It is assumed that a bearer when the UE 50 performs communications through the eNB 60 is different from a bearer when the UE 50 performs communications through the 5G base station 70.

Figure 3:
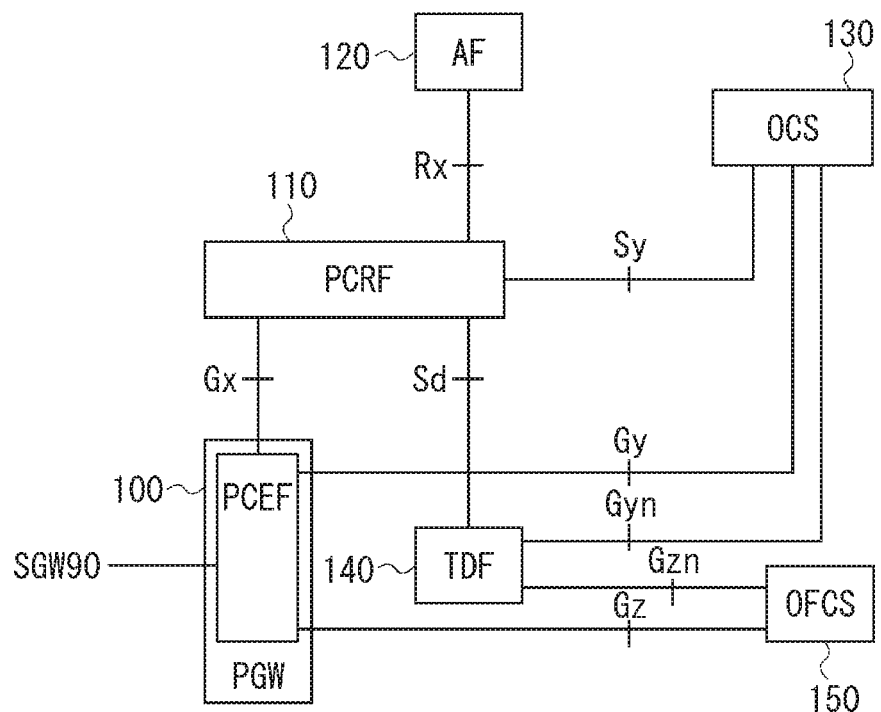
FIG. 3 is a schematic diagram of a charging system according to the second embodiment.

A configuration example of a charging system is described hereinafter with reference to FIG. 3. The charging system in FIG. 3 includes a PGW 100, a PCRF 110, an AF (Application Function) entity 120 (which is referred to hereinafter as AF 120), an OCS (Online Charging System) 130, a TDF (Traffic Detection Function) entity 140 (which is referred to hereinafter as TDF 140), and an OFCS (Offline Charging System) 150. In the charging system of FIG. 3, the PGW 100 may have a PCEF (Policy and Charging Enforcement Function) and communicate with each device that constitutes the charging system by use of the PCEF.

The AF 120 is an application server, and it performs control related to application services to be provided to the UE 50. The TDF 140 detects a service type, for each flow, of data transmitted or received by the PGW 100 through the PCRF 110. The OCS 130 and the OFCS 150 perform charging control or the like in accordance with a charging contract of the UE 50. For example, in the case of a charging contract such as a prepaid service, the OCS 130 having the ability to monitor the traffic at all times performs charging processing. On the other hand, in the case of a monthly charging contract or the like, the OFCS 150 performs charging processing.

Interfaces between devices in the 3GPP are described hereinafter. A Gx interface is defined between the PGW 100 and the PCRF 110. A Gy interface is defined between the PGW 100 and the OCS 130. A Gz interface is defined between the PGW 100 and the OFCS 150. Gyn is defined between the TDF 140 and the OCS 130. Gzn is defined between the TDF 140 and the OFCS 150. An Sd interface is defined between the TDF 140 and the PCRF 110. An Sy interface is defined between the PCRF 110 and the OCS 130. An Rx interface is defined between the PCRF 110 and the AF 120.

The PGW 100 transmits RAT types managed on a bearer-by-bearer basis to each device through the Gx, Gy and Gz interfaces. Further, the PCRF 110 transmits RAT types managed on a bearer-by-bearer basis to each device through the Rx and Sd interfaces.

Figure 4:
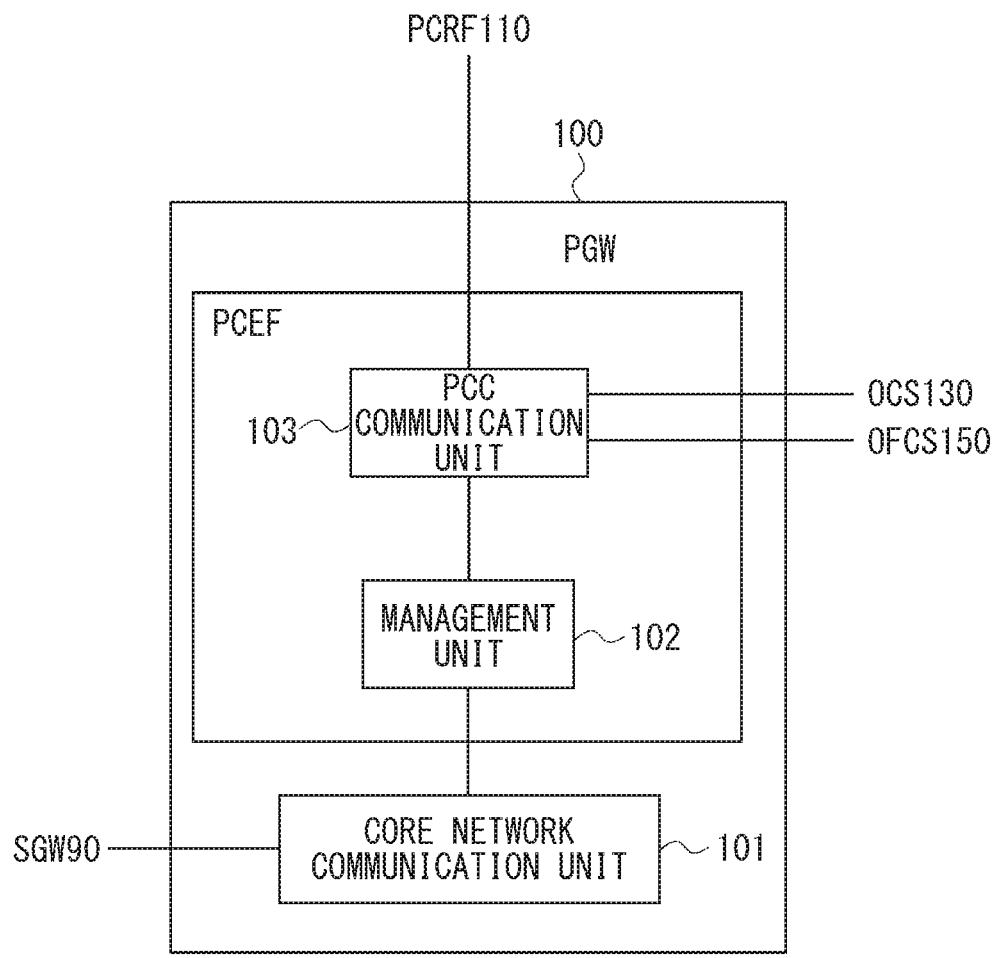
FIG. 4 is a schematic diagram of a PGW according to the second embodiment.

A configuration example of the PGW 100 according to the second embodiment of the present invention is described with reference to FIG. 4. The PGW 100 includes a core network communication unit 101, a management unit 102, and a PCC (Policy and Charging Control) communication unit 103. The PCEF is executed by the management unit 102 and the PCC communication unit 103.

The core network communication unit 101 transmits or receives user data related to the UE 50 to and from the SGW 90. Further, the core network communication unit 101 receives, from the SGW 90, a RAT type that is used for each bearer assigned to the UE 50. The core network communication unit 101 outputs information regarding the received RAT type to the management unit 102.

The management unit 102 manages the RAT type in association with the bearer assigned to the UE 50. An example in which a RAT type is added, in association with a bearer, to a list of parameters managed by the PGW 100 which is specified in 3GPP TS23.401 V13.1.0 (2014-12) Table 5.7.4-1:P-GW context is described with reference to FIG. 5.

In Field shown in FIG. 5, parameters that are managed on a bearer-by-bearer basis by the PGW 100 are written. In Field of FIG. 5, EPS (Evolved Packet System) Bearer ID is set. In Field written below EPS Bearer ID of FIG. 5, parameters that are managed on a per EPS Bearer ID basis are shown. EPS Bearer is a bearer that is set between the UE 50 and the PGW 100.

FIG. 5 shows that the parameters that are managed on a per EPS Bearer ID basis include a RAT type (which is shown at the bottom). In this manner, the management unit 102 of the PGW 100 manages the RAT type and the EPS Bearer ID in association with each other.

Referring back to FIG. 4, the PCC communication unit 103 transmits the RAT type that is managed on a per EPS Bearer ID basis in the management unit 102 to the PCRF 110, the OCS 130 and the OFCS 150.

Note that, also in the case where RAT types are managed on a per UE 50 basis just like the way it used to be, the PCC communication unit 103 transmits the RAT type that is managed on a per EPS Bearer ID basis of FIG. 5, in preference to the RAT that is managed on a per UE 50 basis, to the PCRF 110, the OCS 130 and the OFCS 150.

Figure 6:
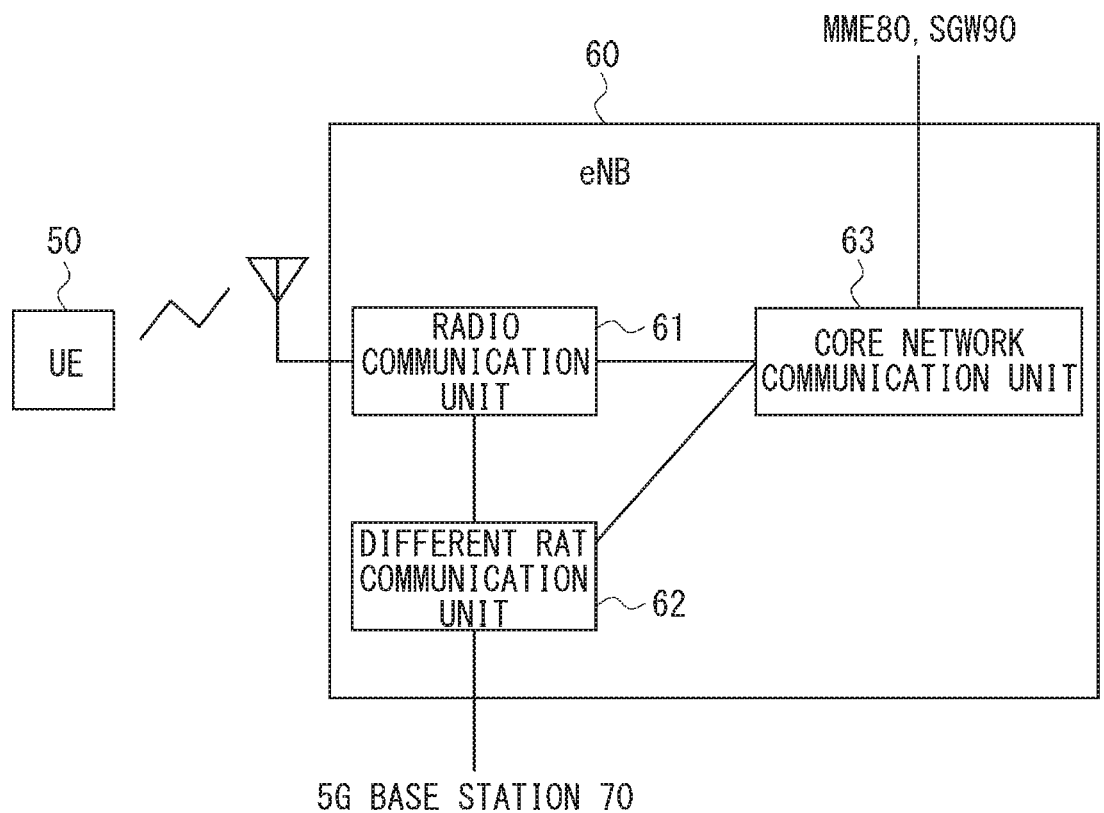
FIG. 6 is a schematic diagram of an eNB according to the second embodiment.

A configuration example of the eNB 60 according to the second embodiment of the present invention is described with reference to FIG. 6. The eNB 60 includes a radio communication unit 61, a different RAT communication unit 62, and a core network communication unit 63. The elements that constitute the eNB 60 may be software, a module or the like whose processing is executed by running, on a processor, a program stored in a memory. Further, the elements that constitute the eNB 60 may be software such as a circuit or a chip.

The radio communication unit 61 performs LTE communications with the UE 50. The different RAT communication unit 62 performs communications with another radio communication device that supports a different radio communication scheme from LTE. In this example, the different RAT communication unit 62 performs communications with the 5G base station 70. The core network communication unit 63 transmits or receives control data to and from the MME 80. The control data may be called C(Control)-Plane data, for example. Further, the core network communication unit 63 transmits or receives user data to and from the SGW 90. The user data may be called U (User)-Plane, for example. Although the core network communication unit 63 transmits or receives control data and user data in this example, a communication unit that transmits or receives control data and a communication unit that transmits or receives user data may be different functional blocks or different interfaces.

The different RAT communication unit 62 carries out processing of adding the 5G base station 70 as a device to form the LTE-5G aggregation when the eNB 60 is performing LTE communications with the UE 50.

Figure 7:
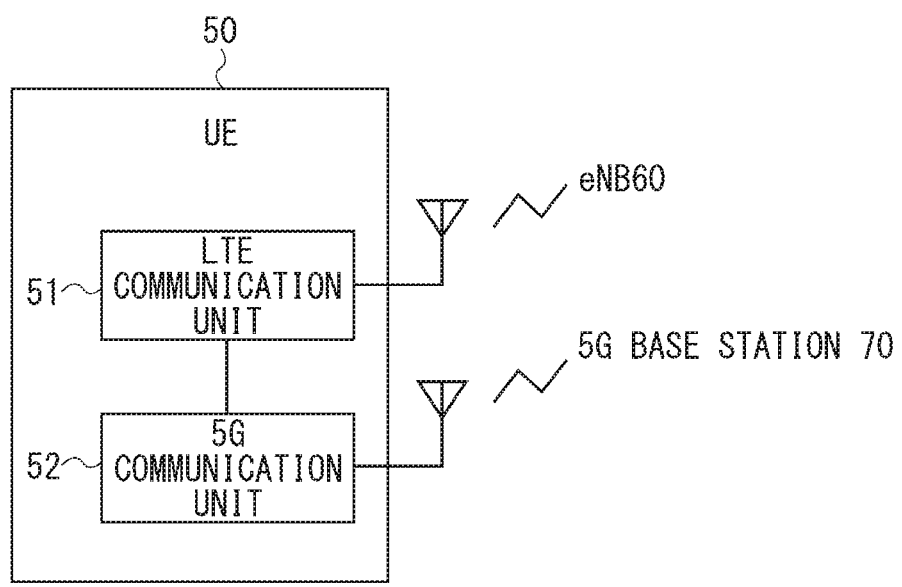
FIG. 7 is a schematic diagram of a UE according to the second embodiment.

A configuration example of the UE 50 is described with reference to FIG. 7. The UE 50 includes an LTE communication unit 51 and a 5G communication unit 52. The LTE communication unit 51 performs LTE communications with the eNB 60. The 5G communication unit 52 performs 5G communications with the 5G base station 70. The UE 50 communicates with the eNB 60 and the 5G base station 70 at the same time by using the LTE communication unit 51 and the 5G communication unit 52 and thereby form the LTE-5G aggregation. Further, the UE 50 is a terminal capable of performing simultaneous communications (dual connections) using a plurality of different radio access technologies.

Figure 8:
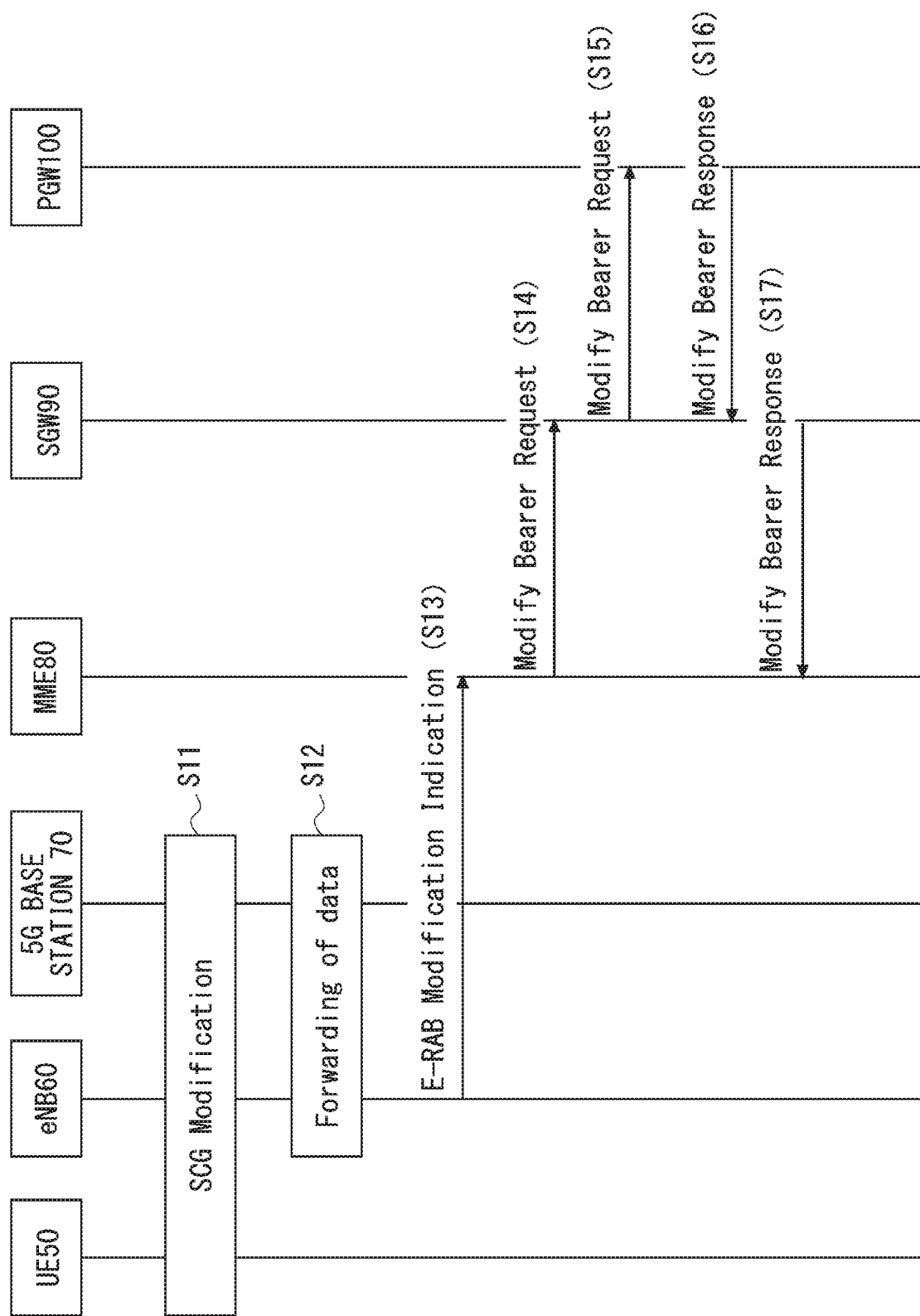
FIG. 8 is a view showing a process flow of transmitting of a RAT type according to the second embodiment.

A process flow of transmitting of a RAT type in the 3GPP according to the second embodiment of the present invention is described hereinafter with reference to FIG. 8. FIG. 8 refers to 3GPP TS23.401 V13.1.0 (2014-12) FIG. 5.4.7-1. FIG. 8 shows a process flow related to E-UTRAN (Evolved Universal Terrestrial Radio Access Network) initiated E-RAB (EPS-Radio Access Bearer) modification procedure. To be specific, FIG. 8 shows a process flow of transmitting a RAT type in the case where the 5G base station 70 is added as a device to form the LTE-5G aggregation when the UE 50 and the eNB 60 are performing LTE communications.

First, the UE 50, the eNB 60 and the 5G base station 70 carry out processing to add the 5G base station 70 (SCG (Secondary Cell Group) Modification) (S11). The SCG indicates a base station (or a service cell formed by the base station) that is added to form the LTE-5G aggregation. To be specific, in FIG. 8, the 5G base station 70 corresponds to the SCG. On the other hand, the eNB 60, with which the UE 50 has communicated initially, corresponds to a MCG (Master Cell Group).

Next, user data is transferred between the eNB 60 and the 5G base station 70 (Forwarding of data) (S 12).

Then, the eNB 60 transmits an E-RAB Modification Indication message to the MME 80 in order to update bearer information after addition of the 5G base station 70 as the SCG (S13). The bearer information to be updated is E-RAB (E-UTRAN Radio Access Bearer). The E-RAB is a bearer that is set between the UE 50 and the SGW 90. Further, the E-RAB corresponds one-to-one with an EPS Bearer that is set between the UE 50 and the PGW 100.

Parameter information that is set to the E-RAB Modification Indication message is described with reference to FIG. 9. Note that FIG. 9 refers to 3GPP TS 36.413 V13.0.0 (2015-06) Section 9.1.3.8. Parameter information that is set to the E-RAB Modification Indication message is written below IE/Group Name.

In E-RAB to be Modified List, parameters regarding the 5G base station 70 that is added to form the LTE-5G aggregation are set. For example, in E-RAB to be Modified Item IEs (Information Elements), E-RAB ID for identifying E-RAB to be assigned when the UE 50 communicates with the 5G base station 70 is set. Further, in E-RAB to be Modified Item IEs, RAT type (5G) indicating the RAT which the UE 50 uses for communications with the 5G base station 70 is set. For example, information indicating 5G may be set as the RAT type that is set to E-RAB to be Modified Item IEs.

The bearer that is set between the UE 50 and the SGW 90 through the 5G base station 70 may be called differently from E-RAB. In FIG. 9, the bearer that is set between the UE 50 and the SGW 90 through the 5G base station 70 is described as E-RAB for the sake of easier explanation. Further, the names E-RAB to be Modified List, E-RAB to be Modified Item IEs, and E-RAB ID may be changed in accordance with the name of the bearer that is set between the UE 50 and the SGW 90 through the 5G base station 70.

In E-RAB not to be Modified List, parameters regarding the eNB 60, with which the UE 50 has communicated initially, are set. For example, in E-RAB not to be Modified Item IEs, E-RAB ID for identifying E-RAB to be assigned when the UE 50 communicates with the eNB 60 is set. Further, in E-RAB to be Modified Item IEs, RAT type (LTE) indicating the RAT which the UE 50 uses for communications with the eNB 60 is set. For example, information indicating LTE may be set as the RAT type that is set to E-RAB to be Modified Item IEs.

The eNB 60 transmits, to the MME 80, the E-RAB Modification Indication message containing the RAT type associated with the E-RAB ID.

Referring back to FIG. 8, the MME 80 receives the E-RAB Modification Indication message and transmits, to the SGW 90, a Modify Bearer Request message to which the RAT type associated with the E-RAB ID is set (S14). Further, the SGW 90 transmits, to the PGW 100, the Modify Bearer Request message to which the RAT type associated with the E-RAB ID is set (S15).

Parameter information that is set to the Modify Bearer Request message is described with reference to FIG. 10. Note that FIG. 10 refers to 3GPP TS 29.274 V13.2.0 (2015-06) Table 7.2.7-2. As shown in FIG. 10, a RAT type and EPS Bearer ID are set to the Modify Bearer Request message. Further, when there are a plurality of E-RAB IDs as in the example of FIG. 9, a plurality of Bearer Context IE Types are set to the Modify Bearer Request message, and a RAT type is set for each EPS Bearer ID. Further, the RAT type may be set for each Modify Bearer Request message. In other words, the RAT type can be set for each UE in the Modify Bearer Request message. In this case, the RAT type that is set to the Modify Bearer Request message is valid for all EPS Bearers. However, in the case where the RAT type is set to each of the Modify Bearer Request message and the EPS Bearer ID, the RAT type that is set to the EPS Bearer ID may be processed in preference to the other.

Referring back to FIG. 8, as a response to the Modify Bearer Request message, the PGW 100 transmits a Modify Bearer Response message to the SGW 90 (S16). Further, the SGW 90 transmits the Modify Bearer Response message to the MME 80 (S17). After Step S17, the SGW 90 can transmit user data addressed to the UE 50 to the eNB 60 and the 5G base station 70. Further, after Step S17, the SGW 90 can receive user data transmitted from the UE 50 through the eNB 60 or the 5G base station 70.

Although the RAT type associated with the E-RAB ID or the EPS Bearer ID is set to the E-RAB Modification Indication message and the Modify Bearer Request message in the process flow of FIG. 8, the RAT type associated with a bearer may be set to another message different from those messages.

For example, FIG. 11 shows that a RAT type is set, for each EPS Bearer ID, to a Create Session Request message that is used in an ATTACH process, a Tracking Area Update process or the like. Note that FIG. 11 refers to 3GPP TS 29.274 V13.2.0 (2015-06) Table 7.2.1-2. The MME 80 transmits, to the SGW 90, the Create Session Request message that is set as above. Further, the RAT type may be set for each Create Session Request message. In other words, the RAT type can be set for each UE in the Create Session Request message. In this case, the RAT type that is set to the Create Session Request message is valid for all EPS Bearers. However, in the case where the RAT type is set to each of the Create Session Request message and the EPS Bearer ID, the RAT type that is set to the EPS Bearer ID may be processed in preference to the other. Further, the SGW 90 transmits (transfers), to the PGW 100, the Create Session Request message that is set as above.

FIG. 12 shows that a RAT type is set, for each EPS Bearer ID, to a Bearer Resource Command message that is used to request assignment of a bearer when the UE 50 adds the 5G base station 70 and forms the LTE-5G aggregation or to request modification of a bearer. Note that FIG. 12 refers to 3GPP TS 29.274 V13.2.0 (2015-06) Table 7.2.5-2. The MME 80 transmits, to the SGW 90, the Bearer Resource Command message that is set as above. Further, the RAT type may be set for each Bearer Resource Command message. In other words, the RAT type can be set for each UE in the Bearer Resource Command message. In this case, the RAT type that is set to the Bearer Resource Command message is valid for all EPS Bearers. However, in the case where the RAT type is set to each of the Bearer Resource Command message and the EPS Bearer ID, the RAT type that is set to the EPS Bearer ID may be processed in preference to the other. Further, the SGW 90 transmits (transfers), to the PGW 100, the Bearer Resource Command message that is set as above.

FIG. 13 shows that a RAT type is set, for each EPS Bearer ID, to an Access Bearers Request message that is used in a handover process where no change occurs in the SGW 90. Note that FIG. 13 refers to 3GPP TS 29.274 V13.2.0 (2015-06) Table 7.2.24-2. The MME 80 transmits, to the SGW 90, the Modify Access Bearers Request message that is set as above. Further, the RAT type may be set for each Modify Access Bearers Request message. In other words, the RAT type can be set for each UE in the Modify Access Bearers Request message. In this case, the RAT type that is set to the Modify Access Bearers Request message is valid for all EPS Bearers. However, in the case where the RAT type is set to each of the Modify Access Bearers Request message and the EPS Bearer ID, the RAT type that is set to the EPS Bearer ID may be processed in preference to the other.

FIG. 14 shows that a RAT type is set, for each EPS Bearer ID, to a Context Request message that is used in a Tracking Area Update process or the like. Note that FIG. 14 refers to 3GPP TS 29.274 V13.2.0 (2015-06) Table 7.3.5-1. The Context Request message is transmitted between an MME before change and an MME after change when the UE 50 moves to a place where a change in the MME occurs. Further, the RAT type may be set for each Context Request message. In other words, the RAT type can be set for each UE in the Context Request message. In this case, the RAT type that is set to the Context Request message is valid for all EPS Bearers. However, in the case where the RAT type is set to each of the Context Request message and the EPS Bearer ID, the RAT type that is set to the EPS Bearer ID may be processed in preference to the other.

FIG. 15 shows that a RAT type is set, for each EPS Bearer ID, to a Change Notification Request message that is transmitted from the MME 80 to the SGW 90. Note that FIG. 15 refers to 3GPP TS 29.274 V13.2.0 (2015-06) Table 7.3.14-1. Further, the RAT type may be set for each Change Notification Request message. In other words, the RAT type can be set for each UE in the Change Notification Request message. In this case, the RAT type that is set to the Change Notification Request message is valid for all EPS Bearers. However, in the case where the RAT type is set to each of the Change Notification Request message and the EPS Bearer ID, the RAT type that is set to the EPS Bearer ID may be processed in preference to the other.

Hereinafter, a process flow when transmitting a RAT type from the PGW 100 to the PCRF 110 is described with reference to FIG. 16.

When the UE 50 forms the LTE-5G aggregation with the eNB 60 and the 5G base station 70, the PGW 100 notifies the PCRF 110 that an IP-CAN (IP-Connectivity Access Network) Session is established. To be specific, the PGW 100 transmits a Diameter CCR (Credit Control Request) message to the PCRF 110 (S21). The PGW 100 sets, to the Diameter CCR message, the RAT type associated with the EPS bearer. The PCRF 110 receives the Diameter CCR message and thereby grasps the RAT type associated with the EPS bearer. Further, the RAT type may be set for each Diameter CCR message. In other words, the RAT type can be set for each UE in the Diameter CCR message. In this case, the RAT type that is set to the Diameter CCR message is valid for all EPS Bearers. However, in the case where the RAT type is set to each of the Diameter CCR message and the EPS bearer, the RAT type that is set to the EPS Bearer ID may be processed in preference to the other.

A process of transmitting a Diameter message between the PCRF 110 and the TDF 140 is described hereinafter with reference to FIG. 17. The PCRF 110 transmits, to the TDF 140, a Diameter TSR (TDF Session Request) message to which an ADC (Application Detection and Control) rule for extracting a specific packet flow from user data traffic regarding the UE 50 is set (S31). The PCRF 110 sets the RAT type associated with the EPS bearer to the Diameter TSR message. Further, the RAT type may be set for each Diameter TSR message. In other words, the RAT type can be set for each UE in the Diameter TSR message. In this case, the RAT type that is set to the Diameter TSR message is valid for all EPS Bearers. However, in the case where the RAT type is set to each of the Diameter TSR message and the EPS bearer, the RAT type that is set to the EPS Bearer may be processed in preference to the other.

After that, the TDF 140 transmits, as a response message, a Diameter TSA (TDF Session Answer) message to the PCRF 110 (S32).

Figure 16:
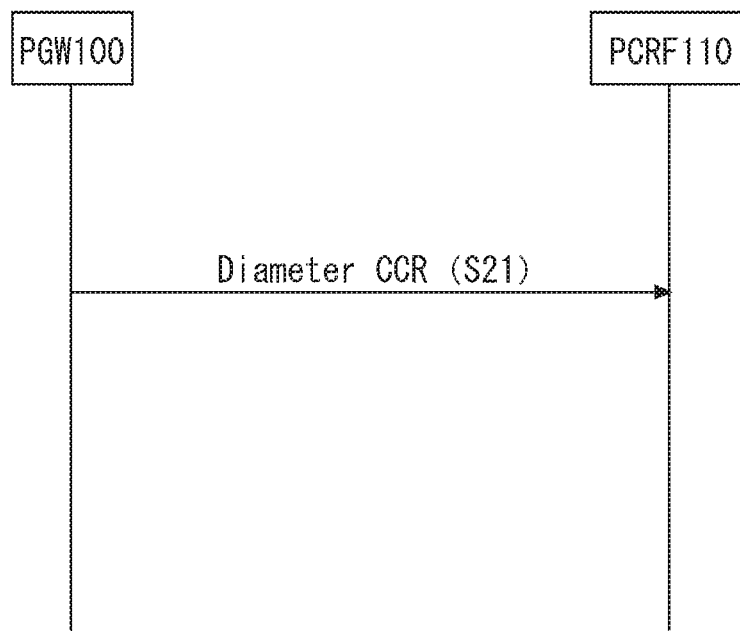
FIG. 16 is a view showing a process flow of transmitting of a RAT type from a PGW to a PCRF according to the second embodiment.
Figure 17:
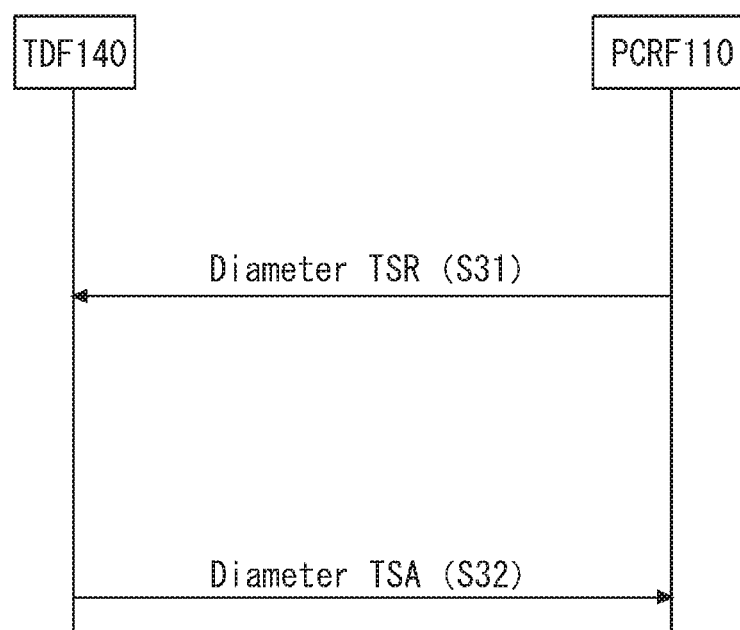
FIG. 17 is a view showing a process flow of transmitting of a Diameter message between a PCRF and a TDF according to the second embodiment.

Besides the examples shown in FIGS. 16 and 17, the RAT type associated with the EPS Bearer is transmitted to the AF 120, the OCS 130 and the OFCS 150 with use of the Diameter message. Further, the RAT type may be set for each Diameter TSA message. In other words, the RAT type can be set for each UE in the Diameter TSA message. In this case, the RAT type that is set to the Diameter TSA message is valid for all EPS Bearers. However, in the case where the RAT type is set to each of the Diameter TSA message and the EPS bearer, the RAT type that is set to the EPS Bearer may be processed in preference to the other.

Figures 18, 19:
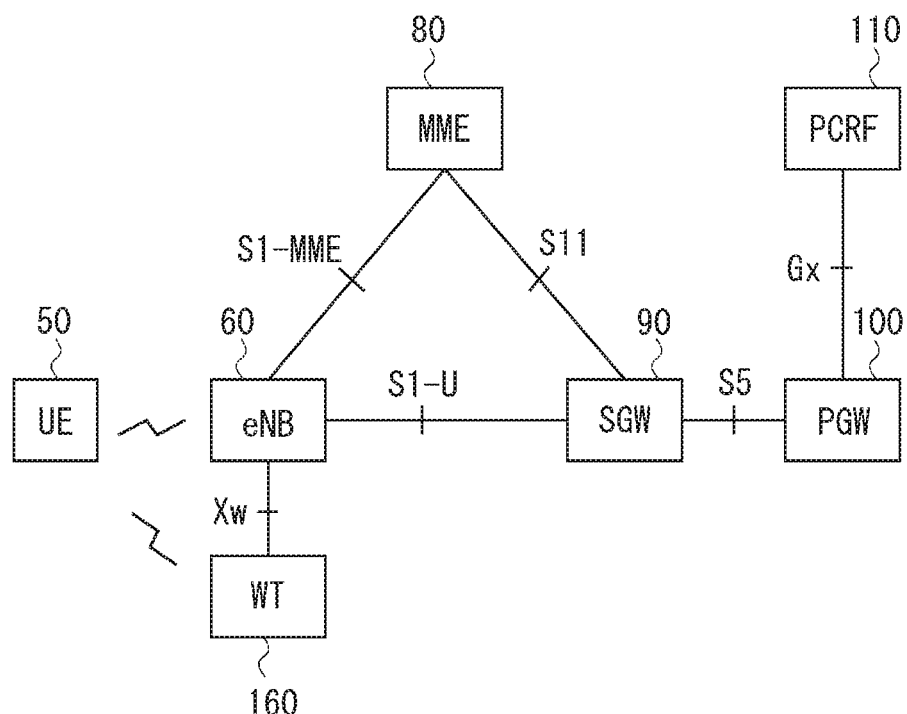
FIG. 18 is a view to explain values of RAT types according to the second embodiment.
FIG. 19 is a schematic diagram of a communication system according to a third embodiment.

Values of RAT types to be set to various messages are described hereinbelow. Currently, in 3GPP TS 29.274 V13.2.0 (2015-06) Table 8.17-1, Values 0 to 7 shown in FIG. 18 are defined as values indicating RAT types. For example, Value 3 indicates wireless LAN (WLAN), and Value 6 indicates EUTRAN (LTE). FIG. 18 shows that 8 is newly added as the value of the RAT type indicating 5G. It is thereby possible to set 6 when LTE is indicated as the RAT type and set 8 when 5G is indicated in each message.

As described above, the RAT type associated with the E-RAB ID or the EPS Bearer ID is set to each message defined in the 3GPP and transmitted to a related node including the PGW 100. Therefore, when the UE 50 forms the LTE-5G aggregation, the PGW 100 can grasp the RAT type for each bearer used by the UE 50, not for each UE 50. The PGW 100 can thereby carry out charging on a bearer-by-bearer basis in accordance with the RAT type for the UE 50 that forms the LTE-5G aggregation.

Third Embodiment

A configuration example of a communication system according to a third embodiment of the present invention is described with reference to FIG. 19. The communication system in FIG. 19 uses an access point WT 160, which performs wireless LAN communications, in place of the 5G base station 70 in FIG. 2. Further, it is assumed that an interface is not set between the WT 160 and the SGW 90, and the WT 160 transmits or receives user data regarding the UE 50 through the eNB 60. An Xw interface is defined between the eNB 60 and the WT 160. The WT 160 may be an AP (Access Point) or a WiFi router that is used as a master unit or a base station in wireless LAN communications, for example.

The communication system in FIG. 19 shows that the UE 50 performs LTE communications with the eNB 60 and performs wireless LAN communications with the WT 160 and forms the LTE-WT aggregation. It is assumed that the eNB 60 sets a bearer that is used for LTE communications with the UE 50 and a bearer that is used for wireless LAN communications through the WT 160 as one bearer. Specifically, the eNB 60 sets two different RATs to one bearer and thereby forms the LTE-WT aggregation with the UE 50.

Values of RAT types to be set to various messages defined in the 3GPP are described hereinbelow. Currently, in 3GPP TS 29.274 V13.2.0 (2015-06) Table 8.17-1, Values 0 to 7 shown in FIG. 20 are defined as values indicating RAT types. For example, Value 3 indicates wireless LAN (WLAN), and Value 6 indicates EUTRAN (LTE).

In the second embodiment, in the case where the UE 50 forms the LTE-5G aggregation, a predetermined Value may be set for each bearer. However, in the case where the UE 50 forms the LTE-WT aggregation as in the third embodiment, a plurality of RATs are included in one bearer. In such a case, it may be defined that the RAT type of Value 8 indicates EUTRAN+WLAN as shown in FIG. 20, for example. Specifically, each node shown in FIG. 19 may determine that the UE 50 forms the LTE-WT aggregation when Value 8 is set as the RAT type.

Alternatively, as shown in FIG. 21, it may be indicated that the UE 50 forms the LTE-WT aggregation by writing values next to each other, like Value 6+3. Note that FIG. 12 refers to 3GPP TS 29.274 V13.2.0 (2015-06) Table 8.17-1.

Further, in FIGS. 20 and 21, a usage rate, in each RAT, of user data transmitted through one bearer may be also defined when the UE 50 forms the LTE-WT aggregation.

For example, in FIG. 20, Value 8 may be defined as EUTRAN (30%)+WLAN (70%), and Value 9 may be defined as EUTRAN (50%)+WLAN (50%) or the like. 30% in EUTRAN (30%) means that 30% of user data transmitted through one bearer is transmitted by LTE communications.

Further, in FIG. 21, a usage rate of LTE communications and WLAN communications may be defined like Value6 (30%)+3 (70%).

Parameter information that is set to the E-RAB Modification Indication message according to the third embodiment of the present invention is described with reference to FIG. 22. As described earlier, it is assumed in the second embodiment that E-RABs that are identified by different E-RAB IDs are used in the eNB 60 and the 5G base station 70 when the UE 50 forms the LTE-5G aggregation in FIG. 9. Thus, in FIG. 9, E-RAB to be Modified List and E-RAB not to be Modified List are contained in the E-RAB Modification Indication message.

On the other hand, in FIG. 22, it is assumed that the same E-RAB is used in the eNB 60 and the WT 160 when the UE 50 forms the LTE-WT aggregation. Thus, in FIG. 9, only E-RAB to be Modified List is contained in the E-RAB Modification Indication message. In E-RAB to be Modified List, a RAT type is set in association with the E-RAB ID. When the UE 50 forms the LTE-WT aggregation, Value where the RAT types indicate EUTRAN+WLAN in FIG. 20 or 21 is set as the RAT type in FIG. 22.

Further, the name of a bearer where LTE communications and wireless LAN communications are set may be different from E-RAB, and it is not limited to the name E-RAB.

As described above, by defining RAT types as in the third embodiment of the present invention, the PGW 100 can accurately grasp the RAT types that are set to one bearer even when a plurality of RAT types are set to one bearer.

Further, by setting a usage rate of each RAT type in the case where a plurality of RAT types are set to one bearer, the PGW 100 can carry out charging for the UE 50 in accordance with the usage rate of the RAT type in charging control.

It should be noted that the present invention is not limited to the above-described embodiments and may be varied in many ways within the scope of the present invention. For example, the LTE-5G aggregation in the second embodiment may be implemented by using one bearer as described in the third embodiment. Further, the LTE-WT aggregation in the third embodiment may be implemented by using two bearers as described in the second embodiment.

Figure 23:
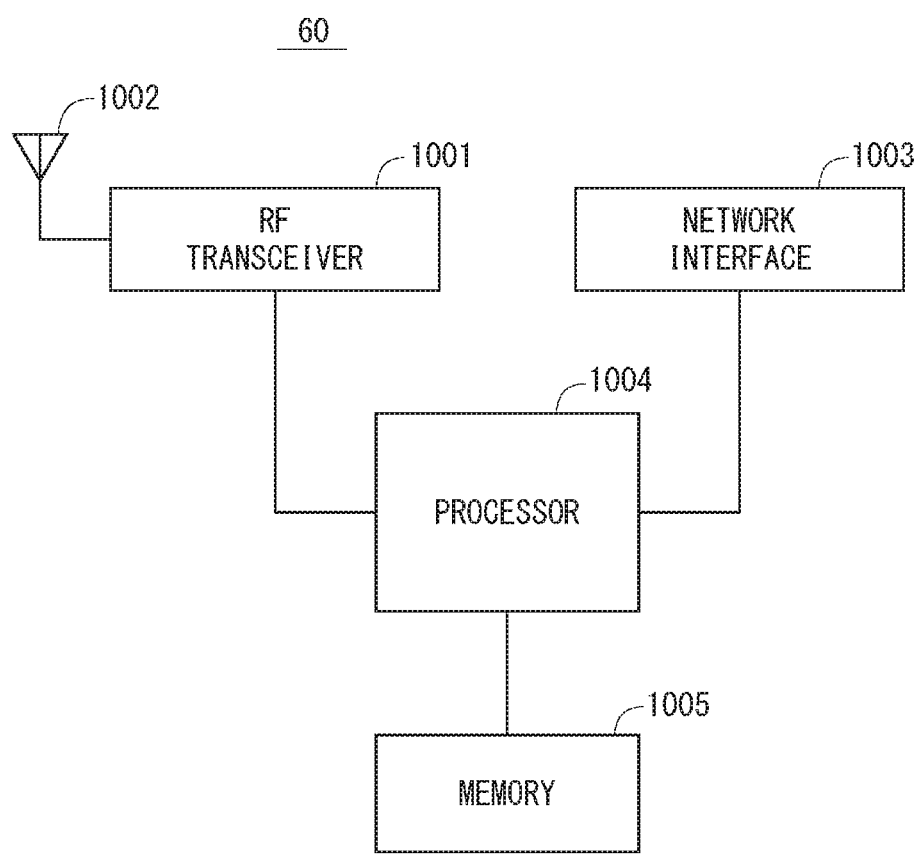
FIG. 23 is a schematic diagram of an eNB in each embodiment.

Configuration examples of the UE 50, and the eNB 60 and the PGW 100 described in the plurality of embodiments above are described hereinafter. FIG. 23 is a block diagram showing a configuration example of the eNB 60. Referring to FIG. 23, the eNB 60 includes an RF transceiver 1001, a network interface 1003, a processor 1004, and a memory 1005. The RF transceiver 1001 performs analog RF signal processing for communication with the UEs. The RF transceiver 1001 may include a plurality of transceivers. The RF transceiver 1001 is connected to an antenna 1002 and a processor 1004. The RF transceiver 1001 receives modulated symbol data (or OFDM symbol data) from the processor 1004, generates a transmission RF signal and supplies the transmission RF signal to the antenna 1002. Further, the RF transceiver 1001 generates a baseband received signal based on a received RF signal received by the antenna 1002 and supplies it to the processor 1004.

The network interface 1003 is used for communications with a network node (e.g., other eNBs, Mobility Management Entity (MME), Serving Gateway (S-GW), and TSS or ITS server). The network interface 1003 may include a network interface card (NIC) compliant to IEEE 802.3 series, for example.

The processor 1004 performs data plane processing including digital baseband signal processing and control plane processing for radio communications. For example, in the case of LTE and LTE-Advanced, the digital baseband signal processing by the processor 1004 may include signal processing of PDCP layer, RLC layer, MAC layer and PHY layer. Further, the signal processing by the processor 1004 may include signal processing of GTP-U·UDP/IP layer in the X2-U interface and the S1-U interface. Furthermore, the control plane processing by the processor 1004 may include processing of X2AP protocol, S1-MME protocol and RRC protocol.

The processor 1004 may include a plurality of processors. For example, the processor 1004 may include a modem processor (e.g., DSP) that performs digital baseband signal processing, a processor (e.g., DSP) that performs signal processing of GTP-U·UDP/IP layer in the X2-U interface and the S1-U interface, and a protocol stack processor (e.g., CPU or MPU) that performs control plane processing.

The memory 1005 is a combination of a volatile memory and a nonvolatile memory. The memory 1005 may include a plurality of memory devices that are physically independent of one another. The volatile memory is a Static Random Access Memory (SRAM), a Dynamic RAM (DRAM), or a combination of them, for example. The nonvolatile memory is a mask Read Only Memory (MROM), an Electrically Erasable Programmable ROM (EEPROM), a flash memory, a hard disk drive, or a combination of them, for example. The memory 1005 may include a storage that is placed apart from the processor 1004. In this case, the processor 1004 may access the memory 1005 through the network interface 1003 or an I/O interface, which is not shown.

The memory 1005 may store a software module (computer program) containing a group of instructions and data for performing the processing by the eNB 40 described in the above plurality of embodiments. In several implementations, the processor 1004 may be configured to perform the processing of the eNB 60 described in the above embodiments by reading the software module from the memory 1005 and executing it.

Figure 24:
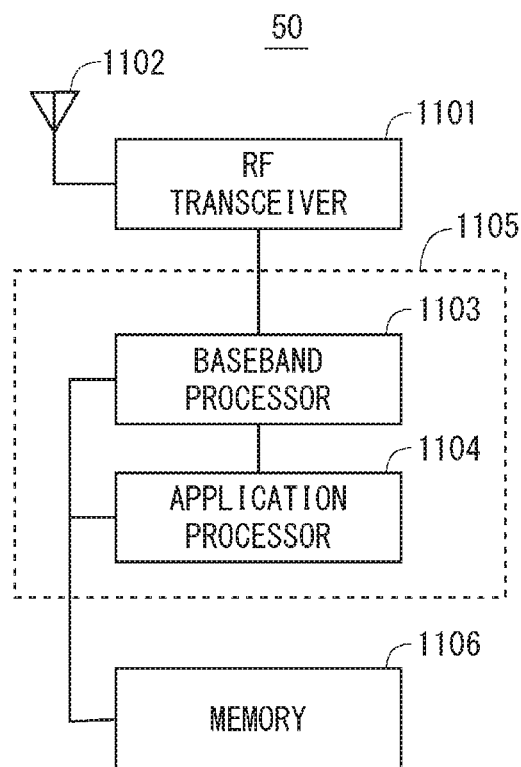
FIG. 24 is a schematic diagram of a UE in each embodiment.

FIG. 24 is a block diagram showing a configuration example of the UE 50. A Radio Frequency (RF) transceiver 1101 performs analog RF signal processing for communication with the eNB 60 and the 5G base station 70. The analog RF signal processing performed by the RF transceiver 1101 includes frequency up-conversion, frequency down-conversion, and amplification. The RF transceiver 1101 is connected to an antenna 1102 and a baseband processor 1103. Specifically, the RF transceiver 1101 receives modulated symbol data (or OFDM symbol data) from the baseband processor 1103, generates a transmission RF signal and supplies the transmission RF signal to the antenna 1102. Further, the RF transceiver 1101 generates a baseband received signal based on a received RF signal received by the antenna 1102 and supplies it to the baseband processor 1103.

The baseband processor 1103 performs digital baseband signal processing (data plane processing) and control plane processing for radio communications. The digital baseband signal processing includes (a) data compression/decompression, (b) data segmentation/concatenation, (c) transmission format (transmission frame) composition/decomposition, (d) transmission path encoding/decoding, (e) modulation (symbol mapping)/demodulation, and (f) OFDM symbol data (baseband OFDM signal) generation by Inverse Fast Fourier Transform (IFFT) and the like. On the other hand, the control plane processing includes communication management of Layer 1 (e.g., transmission power control), Layer 2 (e.g., radio resource management and hybrid automatic repeat request (HARQ) processing), and Layer 3 (e.g., attach, mobility, and signaling related to call management).

For example, in the case of LTE and LTE-Advanced, the digital baseband signal processing by the baseband processor 1103 may include signal processing of Packet Data Convergence Protocol (PDCP) layer, Radio Link Control (RLC) layer, MAC layer, and PHY layer. Further, the control plane processing by the baseband processor 1103 may include processing of Non-Access Stratum (NAS) protocol, RRC protocol, and MAC CE.

The baseband processor 1103 may include a modem processor (e.g., Digital Signal Processor (DSP)) that performs digital baseband signal processing and a protocol stack processor (e.g., Central Processing Unit (CPU) or Micro Processing Unit (MPU)) that performs control plane processing. In this case, the protocol stack processor that performs control plane processing may be made common to an application processor 1104, which is described below.

The application processor 1104 is also called a CPU, an MPU, a microprocessor or a processor core. The application processor 1104 may include a plurality of processors (a plurality of processor cores). The application processor 1104 implements each function of the UE 50 by running a system software program (Operating System (OS)) and various application programs (e.g., call application, web browser, mailer, camera control application, music playback application etc.) read from a memory 1106 or a memory, which is not shown.

In several implementations, as shown in the dotted line (1105) in FIG. 24, the baseband processor 1103 and the application processor 1104 may be integrated into one chip. In other words, the baseband processor 1103 and the application processor 1104 may be implemented as one System on Chip (SoC) device 1105. The SoC device is also called a system Large Scale Integration (LSI) or a chip set in some cases.

The memory 1106 is a volatile memory, a nonvolatile memory, or a combination of them. The memory 1106 may include a plurality of memory devices that are physically independent of one another. The volatile memory is a Static Random Access Memory (SRAM), a Dynamic RAM (DRAM), or a combination of them, for example. The nonvolatile memory is a mask Read Only Memory (MROM), an Electrically Erasable Programmable ROM (EEPROM), a flash memory, a hard disk drive, or a combination of them, for example. For example, the memory 1106 may include an external memory device that is accessible from the baseband processor 1103, the application processor 1104 and the SoC 1105. The memory 1106 may include an internal memory device that is integrated into the baseband processor 1103, the application processor 1104 or the SoC 1105. Further, the memory 1106 may include a memory in a Universal Integrated Circuit Card (UICC).

The memory 1106 may store a software module (computer program) containing a group of instructions and data for performing the processing by the UE 50 described in the above plurality of embodiments. In several implementations, the baseband processor 1103 or the application processor 1104 may be configured to perform the processing of the UE 50 described in the above embodiments by reading the software module from the memory 1106 and executing it.

Figure 25:
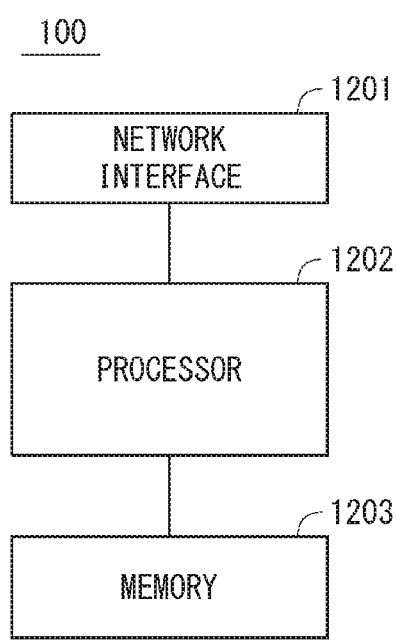
FIG. 25 is a schematic diagram of a PGW in each embodiment.

FIG. 25 is a block diagram showing a configuration example of the PGW 100. Referring to FIG. 25, the PGW 100 includes a network interface 1211, a processor 1202, and a memory 1203. The network interface 1201 is used to communicate with network nodes (e.g., the eNodeB 130, MME, P-GW). The network interface 1201 may include a network interface card (NIC) that complies with the IEEE 802.3 series, for example.

The processor 1202 reads and runs software (computer program) from the memory 1203 and thereby executes processing of the PGW 100 that is described with reference to the sequence charts and the flowcharts in the embodiments described above. The processor 1202 may be a microprocessor, an MPU or a CPU, for example. The processor 1202 may include a plurality of processors.

The memory 1203 is a combination of a volatile memory and a nonvolatile memory. The memory 1203 may include a storage that is placed apart from the processor 1202. In this case, the processor 1202 may access the memory 1203 through an I/O interface, which is not shown.

In the example of FIG. 25, the memory 1203 is used to store a group of software modules. The processor 1202 reads and runs the group of software modules from the memory 1203 and can thereby perform the processing of the PGW 100 described in the above embodiments.

As described with reference to FIGS. 23 and 25, each of processors included in the UE 50, the eNB 60 and the PGW 100 runs one or a plurality of programs including a group of instructions for causing a computer to perform the algorithms described using the drawings.

In the above example, the program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, DVD-ROM (Digital Versatile Disc Read Only Memory), DVD-R (DVD Recordable)), DVD-R DL (DVD-R Dual Layer)), DVD-RW (DVD ReWritable)), DVD-RAM), DVD+R), DVR+R DL), DVD+RW), BD-R (Blu-ray (registered trademark) Disc Recordable)), BD-RE (Blu-ray (registered trademark) Disc Rewritable)), BD-ROM), and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

While the invention has been particularly shown and described with reference to embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2015-180484 filed on Sep. 14, 2015, the disclosure of which is incorporated herein in its entirety by reference.

Further, the whole or part of the embodiments disclosed above can be described as, but not limited to, the following supplementary notes.

Supplementary Note 1

A gateway device comprising:

a management unit configured to, when a communication terminal forms communication aggregation by performing a first radio communication using a first radio access technology and a second radio communication using a second radio access technology, manage at least one bearer assigned to the communication terminal in association with information indicating the first and second radio access technologies; and a charging system communication unit configured to transmit the information indicating the first and second radio access technologies to at least one charging control device that performs charging control.

Supplementary Note 2

The gateway device according to Supplementary Note 1, wherein the charging system communication unit transmits, to the at least one charging control device, a Diameter message to which the information indicating the radio access technology is set.

Supplementary Note 3

The gateway device according to Supplementary Note 1 or 2, wherein, when a first bearer is assigned to the first radio communication and a second bearer is assigned to the second radio communication, the management unit manages the first bearer in association with first type information indicating the first radio access technology, and manages the second bearer in association with second type information indicating the second radio access technology.

Supplementary Note 4

The gateway device according to Supplementary Note 3, wherein the management unit further manages the first bearer and the first type information in association with the second bearer and the second type information, and manages the communication terminal in association with the first type information, and the charging system communication unit transmits, to the charging control device, the first type information associated with the first bearer and the second type information associated with the second bearer in preference to the first type information associated with the communication terminal.

Supplementary Note 5

The gateway device according to Supplementary Note 1 or 2, wherein, when a third bearer is assigned to the first and second radio communications, the management unit manages the third bearer in association with third type information indicating the first radio access technology and the second radio access technology.

Supplementary Note 6

The gateway device according to Supplementary Note 5, wherein the management unit further manages the third bearer in association with the third type information, and manages the communication terminal in association with the first type information indicating the first radio access technology, and the charging system communication unit transmits, to the charging control device, the third type information associated with the third bearer in preference to the first type information associated with the communication terminal.

Supplementary Note 7

The gateway device according to any one of Supplementary Notes 1 to 6, further comprising:

a core network communication unit configured to receive a control message associating at least one bearer assigned to the communication terminal with information regarding the first and second radio access technologies from a network device that performs control related to transmission of user data between the gateway device and a first radio communication device that performs the first radio communication and a second radio communication device that performs the second radio communication.

Supplementary Note 8

The gateway device according to Supplementary Note 7, wherein the control message includes at least one of a Create Session Request message, a Bearer Resource Command message, a Modify Bearer Request message, a Modify Access Bearers Request message, a Context Request message, and a Change Notification Request message.

Supplementary Note 9

A radio communication device that performs a first radio communication using a first radio access technology with a communication terminal, wherein, when the communication terminal forms communication aggregation by performing the first radio communication and a second radio communication using a second radio access technology, the radio communication device transmits information associating at least one bearer assigned to the communication terminal and information indicating the first and second radio access technologies to a network device that manages the bearer.

Supplementary Note 10

A charging control method comprising:

when a communication terminal forms communication aggregation by performing a first radio communication using a first radio access technology and a second radio communication using a second radio access technology, managing at least one bearer assigned to the communication terminal in association with information indicating the first and second radio access technologies; and transmitting the information indicating the first and second radio access technologies to at least one charging control device that performs charging control.

Supplementary Note 11

A data transmission method used in a radio communication device that performs a first radio communication using a first radio access technology with a communication terminal, comprising:

when the communication terminal forms communication aggregation by performing the first radio communication and a second radio communication using a second radio access technology, transmitting information associating at least one bearer assigned to the communication terminal and information indicating the first and second radio access technologies to a network device that manages the bearer.

Supplementary Note 12

A program causing a computer to execute:

when a communication terminal forms communication aggregation by performing a first radio communication using a first radio access technology and a second radio communication using a second radio access technology, managing at least one bearer assigned to the communication terminal in association with information indicating the first and second radio access technologies; and transmitting the information indicating the first and second radio access technologies to at least one charging control device that performs charging control.

Supplementary Note 13

A program to be executed by a computer that performs a first radio communication using a first radio access technology with a communication terminal, the program causing the computer to execute:

when the communication terminal forms communication aggregation by performing the first radio communication and a second radio communication using a second radio access technology, transmitting information associating at least one bearer assigned to the communication terminal and information indicating the first and second radio access technologies to a network device that manages the bearer.

REFERENCE SIGNS LIST

10 COMMUNICATION TERMINAL
21 RADIO COMMUNICATION DEVICE
22 RADIO COMMUNICATION DEVICE
30 GATEWAY DEVICE
31 MANAGEMENT UNIT
32 CHARGING SYSTEM COMMUNICATION UNIT
40 CHARGING CONTROL DEVICE
50 UE
51 LTE COMMUNICATION UNIT
52 5G COMMUNICATION UNIT
60 eNB
61 RADIO COMMUNICATION UNIT
62 DIFFERENT RAT COMMUNICATION UNIT
63 CORE NETWORK COMMUNICATION UNIT
70 5G BASE STATION
80 MME
90 SGW
100 PGW
101 CORE NETWORK COMMUNICATION UNIT
102 MANAGEMENT UNIT
103 PCC COMMUNICATION UNIT
110 PCRF
120 AF
130 OCS
140 TDF
150 OFCS
160 WT

The invention claimed is:

1. A method for a first communication apparatus in a core network, the method comprising:
   receiving, from a first base station that connects to a communication terminal by using a first radio access technology (RAT), indication including a RAT type that indicates a second RAT, which is used for connecting to the communication terminal by a second base station and is different from the first RAT, and an identifier that identifies a traffic flow between the communication terminal and a second communication apparatus in the core network; and
   providing, to a third communication apparatus in the core network, a first message including the RAT type that indicates the second RAT and the identifier that identifies the traffic flow.

2. The method according to claim 1, wherein the RAT type that indicates the second RAT is associated with the identifier that identifies the traffic flow in the first message.

3. A first communication apparatus in a core network comprising:
- a receiver configured to
  - receive, from a first base station that connects to a communication terminal by using a first radio access technology (RAT), indication including a RAT type that indicates a second RAT, which is used for connecting to the communication terminal by a second base station and is different from the first RAT, and an identifier that identifies a traffic flow between the communication terminal and a second communication apparatus in the core network; and
- a transmitter configured to
  - provide, to a third communication apparatus in the core network, a first message including the RAT type that indicates the second RAT and the identifier that identifies the traffic flow.

4. The first communication apparatus according to claim 3, wherein the RAT type that indicates the second RAT is associated with the identifier that identifies the traffic flow in the first message.

\* \* \* \* \*